(12) United States Patent
Cattaneo et al.

(10) Patent No.: US 7,820,592 B2
(45) Date of Patent: Oct. 26, 2010

(54) COMPOSITION AND DEVICES FOR GAS SORPTION AND PROCESS FOR THEIR MANUFACTURING

(75) Inventors: Lorena Cattaneo, Busto Arsizio VA (IT); Alessandro Gallitognotta, Origgio VA (IT)

(73) Assignee: Saes Getters S.p.A., Lainate MI (IT)

( * ) Notice: Subject to any disclaimer, the term of this patent is extended or adjusted under 35 U.S.C. 154(b) by 981 days.

(21) Appl. No.: 11/199,424

(22) Filed: Aug. 8, 2005

(65) Prior Publication Data

US 2005/0272601 A1 Dec. 8, 2005

Related U.S. Application Data

(63) Continuation of application No. PCT/IT2004/000053, filed on Feb. 11, 2004.

(30) Foreign Application Priority Data

Feb. 17, 2003 (IT) ........................... MI2003A0282
Sep. 3, 2003 (IT) ........................... MI2003A1699

(51) Int. Cl.
*B01J 23/02* (2006.01)
(52) U.S. Cl. ................. 502/439; 502/400; 502/406
(58) Field of Classification Search ............... 502/400, 502/406, 439
See application file for complete search history.

(56) References Cited

U.S. PATENT DOCUMENTS

| 4,985,296 A | 1/1991 | Mortimer, Jr. |
| 5,078,909 A | 1/1992 | Shigeta et al. |
| 5,882,761 A | 3/1999 | Kawami et al. |
| 6,338,830 B1 * | 1/2002 | Moskovitz et al. .......... 423/210 |

FOREIGN PATENT DOCUMENTS

| EP | 0 520 257 A2 | 12/1992 |
| EP | 0 700 718 B1 | 1/2000 |
| EP | 1 079 666 A2 | 2/2001 |
| EP | 1 270 675 A1 | 1/2003 |
| JP | 54-024285 | 2/1979 |
| JP | 08118551 A1 | 5/1996 |
| JP | 11-045778 A | 2/1999 |
| RU | 2 036 698 C1 | 6/1995 |
| RU | 2 124 197 C1 | 12/1998 |
| WO | 99/27010 | 6/1999 |
| WO | WO 01/88041 A1 | 11/2001 |
| WO | WO 02/27812 A1 | 4/2002 |

* cited by examiner

*Primary Examiner*—Edward M Johnson
(74) *Attorney, Agent, or Firm*—Panitch Schwarze Belisario & Nadel LLP

(57) ABSTRACT

Compositions and devices for gas sorption are provided that can be activated just before their use, which hence do not need storing under inert atmosphere during storage and transportation.

17 Claims, 1 Drawing Sheet

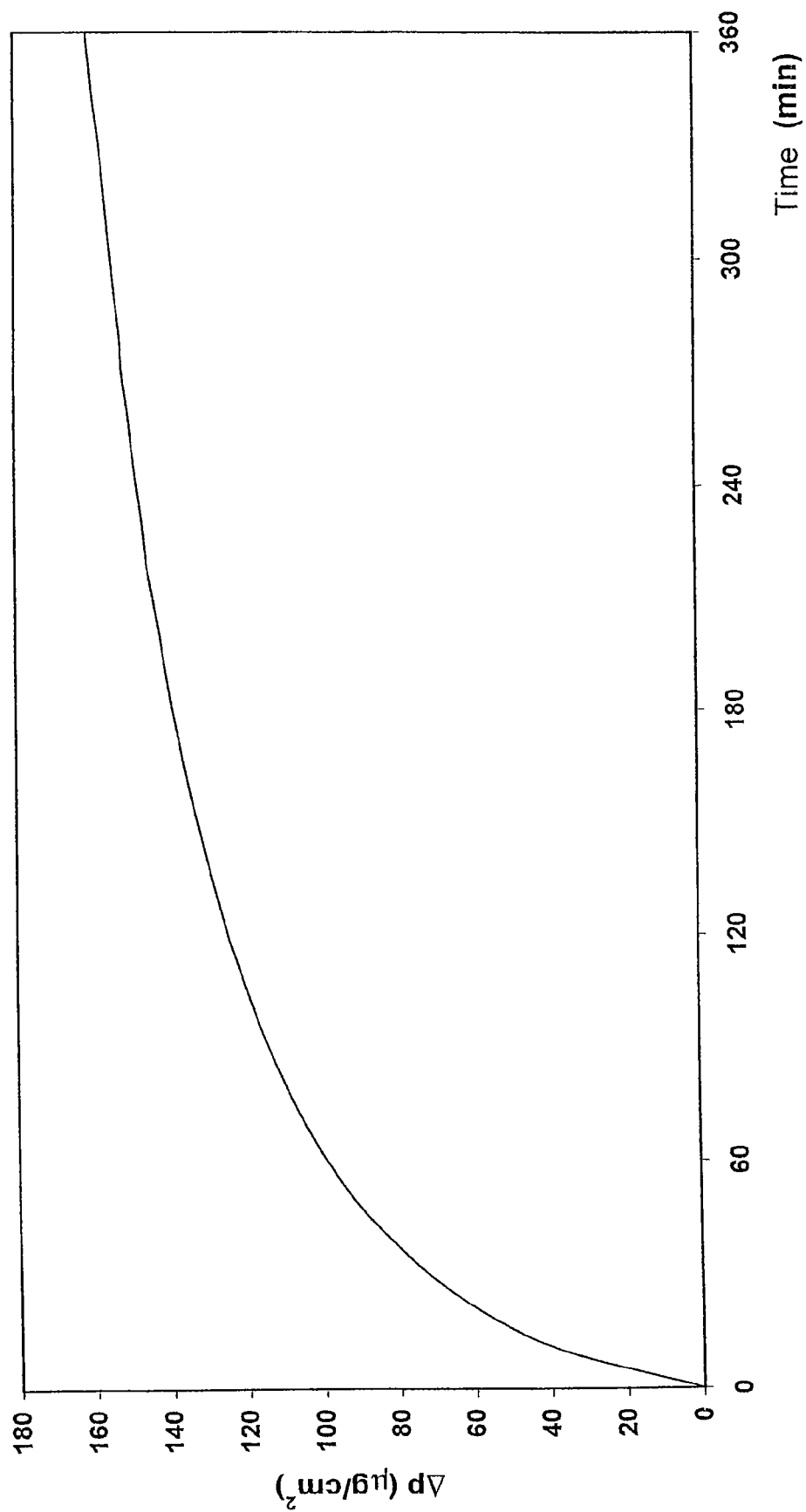

COMPOSITION AND DEVICES FOR GAS SORPTION AND PROCESS FOR THEIR MANUFACTURING

CROSS-REFERENCE TO RELATED APPLICATIONS

This application is a continuation of International Application No. PCT/IT2004/000053, filed Feb. 11, 2004, which was published in the English language on Aug. 26, 2004, under International Publication No. WO 2004/072604 A2 and the disclosure of which is incorporated herein by reference.

BACKGROUND OF THE INVENTION

The present invention relates to a composition for gas sorption, as well as to devices formed with the composition; the invention also refers to processes for obtaining the composition.

In particular, the invention refers to compositions and devices for sorption of traces of gases, both residual gases in evacuated chambers and impurities in inert gases, in applications in which the space available for the sorbing device is reduced.

Examples of systems requiring the control of the internal atmosphere, but having only limited room for the gas sorbing device, are flat panel displays, both field emission displays (also known as FEDs, generally requiring an inner vacuum atmosphere) and plasma displays (also known as PDPs, inside which there is an atmosphere of a given composition). Another particularly important application is represented by the OLED (Organic Light Emitting Display) screens, in which sorption of moisture from the screen inner space is essential, but it can be necessary also to sorb other gases, such as oxygen or carbon dioxide. Due to the relevance of this application, in the following description reference will be made to these screens, but it is intended that compositions and sorbing devices of the invention can be used in a wide range applications needing gas sorption, particularly when the thickness available for housing the sorbing device is small.

OLED screens are used as displays for mobile phones, for Hi-Fi equipment, for car dashboards and the like. These kinds of screens and the problems related to water entering inside them are disclosed, for example, in U.S. Pat. No. 5,882,761.

The search publication RD 430061 and International Patent Application Publication WO-A-02/27812 of SAES Getters S.p.A. disclose moisture-sorbing systems which are specific for OLEDs. These systems are formed of a part with a central cavity filled with drying material, and welded at the edges to a water-permeable membrane.

U.S. Pat. Nos. 4,985,296 and 5,078,909 and International Patent Application Publication WO-A-01/88041 disclose sorbing systems based on an alternative approach to the problem, namely powders of the material active in gas sorption are incorporated in a resin or in a polymeric material, having gas permeability sufficient to allow gases to reach the particles of sorbing material.

A problem common to all the known sorbing systems is nevertheless that these, once manufactured, must be kept under inert atmosphere, throughout storage time and during transportation, to avoid in these steps any contact with reactive gases and hence their loss of functionality.

BRIEF SUMMARY OF THE INVENTION

An object of the present invention is to provide a composition and sorbing devices obtained using this composition which avoid the above problem.

This object is achieved according to the present invention by a composition comprising a gas sorbing component A dispersed in a component B, the latter being in the form of a cross-linked and porous matrix, the composition being obtainable by a process in which:
  at least one material A', that can be converted through a thermal treatment into the sorbing component A, is mixed with a component B or a precursor B' thereof, wherein B is chosen for mixing with A' if B is capable of resisting essentially unaltered the thermal treatment for changing A' into A, while B' is chosen for mixing with A' if B' is able to transform into B after the thermal treatment; and
  the so obtained mixture is subjected to a thermal treatment under vacuum or under an atmosphere of a gas inert as regards component A, in conditions such as to cause the conversion of material A' into sorbing component A.

As used above with reference to component B, "essentially unaltered" means that this component either resists unchanged the thermal treatment, or, if it undergoes modifications during the treatment, these are such that characteristics indicated for B, namely porosity and cross-linking, are retained.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

The FIGURE is a graph plotting the weight increase $\Delta p$ versus time to show the result of a moisture sorption test from a device made from a composition of the invention.

DETAILED DESCRIPTION OF THE INVENTION

The invention differs from all known systems because the active component A is not added as such to a matrix (e.g., polymeric) during the first steps of system manufacturing, but it is mixed into the matrix (or a precursor thereof) in the form of a precursor A' thereof, which is only subsequently converted into active component A, for example just before using in the device of final desired. In this way, the composition of the invention is inactive for gas sorbing throughout storage and transportation steps, and consequently in these steps particular precautions, such as storage in containers sealed under vacuum or under inert atmosphere, are not needed.

Material A', sorbing component precursor in the composition of the invention, can be selected among any materials that may be converted into a component A capable of gas sorption by a treatment at not too high temperature, or in not too onerous conditions. The treatment conditions are fixed by component B (or material B'), and by the support onto which the composition is laid. In general, these conditions must be such as not to destroy the cross-linked structure of B or close its pores, and not to destroy the support.

In case component A is a moisture sorber, this could be an alkaline-earth metal oxide, in particular selected among calcium oxide, CaO, strontium oxide, SrO, and barium oxide, BaO. In this case, preferred precursor materials A' are the related hydroxides, $Ca(OH)_2$, $Sr(OH)_2$ and $Ba(OH)_2$ respectively, that can be dehydrated to yield the oxides by treatments at temperatures from about 300 to 650° C. over a few hours, under vacuum or under inert atmosphere (the dehydration of $Ca(OH)_2$ can be carried out under gas, while $Sr(OH)_2$ and $Ba(OH)_2$ require vacuum). If dehydration is performed under an inert gas, this is preferably flowing. Among these oxides, BaO presents the best features in moisture sorption, but the use of CaO is preferred owing to low price of its precursor and because, unlike BaO, it does not present toxicity problems. Transformation of $Ca(OH)_2$ into CaO occurs successfully, in about 2 hours, at a temperature of about 300° C. under vacuum. Decrease of treatment times is also possible by increasing temperature, for example up to about 500° C. Calcium oxide has the additional advantage that upon moisture sorption it is changed into the hydroxide (reaction A→A'), that has the capability of sorbing carbon dioxide, $CO_2$. Some producers of OLEDs have indicated that the proper functioning of these devices also requires the sorption of this gas. Another possible moisture sorber is boron oxide, $B_2O_3$, obtainable in a particularly active form from boric acid, $H_3BO_3$, according to the procedures disclosed in U.S. Pat. No. 6,304,367 (treatment at temperatures lower than 200° C., preferably at low pressure).

When the gas to be sorbed is oxygen, component A can be, for example, a transition metal oxide in which the metal has a low oxidation state and is easily further oxidizable. An oxide of this type is, for example, manganese (II) oxide, MnO, that easily sorbs oxygen changing into $Mn_2O_3$ A precursor A' suited for obtaining MnO is manganese carbonate, $MnCO_3$, that is quickly converted into the oxide by a thermal treatment at about 300° C. under vacuum. Other useful components A for the sorption of oxygen are FeO and Ni in finely dispersed form, that can be obtained through thermal decomposition under vacuum of the corresponding oxalates, respectively $FeC_2O_4$ and $NiC_2O_4$, at temperatures in the range 350-400° C. In case A is a metal such as Ni, the dispersion may be favored by the fact that decomposition takes place in the matrix B or while this is formed, so the metal forms "islands" that deposit on the internal surfaces of the matrix, or small metallic aggregates that are trapped by the same matrix.

The above cited components A are all chemical sorbers, namely, they sorb moisture through a chemical reaction that transforms A into another compound. However, the invention is not limited to chemical gas sorbers, and A can also be a physical sorber, namely, a material that fixes gas molecules at its surface by adsorption. In this case too, carrying out the thermal conversion of A into A' in a matrix helps in obtaining material A in a finely divided form, that ensures good sorption properties. An example of a possible physical sorber (component A) is γ-alumina, that can be obtained by thermal decomposition under vacuum at around 300° C. of norstrandite, a form of aluminum hydroxide, $Al(OH)_3$, or by thermal decomposition under vacuum at around 250° C. of boehmite, a form of aluminum oxo-hydroxide, AlOOH.

Obviously, compositions of the invention can comprise several A-type components, and therefore be obtained from mixtures comprising several A'-type materials. For example, in an OLED application, besides moisture, a damaging effect due to oxygen seems to be present, and in this case a composition obtained from a mixture comprising $Ca(OH)_2$ and $MnCO_3$ can be used. In these cases, the thermal treatment conditions to which the mixture must be subjected, must be chosen in order to ensure effective conversion of all materials A' into related sorbing components A.

In the starting mixture, materials A' are generally used in the form of powders. These have preferably particle sizes lower than about 100 µm, and more preferably lower than 50 µm and even more preferably lower than 30 µm. During thermal treatment for converting A' into A, powders obviously also undergo a morphologic transformation, and it is observed that granule sizes slightly decrease, while essentially keeping the same order of magnitude. Accordingly, materials A' must be used as fine powders to easily ensure, first of all, their homogeneous dispersion in final composition and high surface area of component A (decisive for obtaining good properties in gas sorption), and moreover, to allow achievement of devices having a thin thickness from these compositions.

Component B and material B' are such that, during thermal treatment for converting A' into A, they respectively either retain cross-linked structure and porosity or transform into a B-type component. B component has inner cohesion and is capable of retaining particles of A. The preferred component B or material B' may be certain silicone resins resistant to high temperature treatments, for example used as carriers of heat-resistant paints for mufflers, boilers or similar applications. Phenyl-methyl-polysiloxane resins, supplied by Tego Chemie Service Italia of Pandino (CR) Italy as Silikophen® (registered trademark of Goldschmidt AG of Germany), are examples. These resins are resistant in continuous treatment, by themselves, at temperatures up to 350° C., and up to about 650° C. when filled with inorganic materials. Determining chemical composition or structure of these resins is extremely complicated, especially after thermal treatment. However, IR analyses showed that, after thermal treatments necessary for converting A' into A, these resins lose only partially their organic components and undergo partial vitrification. In these treatments, resins used in compositions of the invention keep cross-linking, as shown by particle retention even after treatment, and keep adhesion to the substrate even if wrapped around objects with a circular section having a diameter of about 1 cm.

In the mixtures used to manufacture compositions of the invention, the weight percent of A can vary within wide limits, depending on specific weight of A'. In case of mixtures of $Ca(OH)_2$ in Silikophen®, initial filling up to about 50% can be reached, obtaining after thermal treatment a homogenous sorbing composition, as experimentally proved.

Adding other components to the mixture comprising A' and B (or B') is also possible. For example, it is possible to add a solvent, such as alcohols, glycols, polyethers, and esters, useful for controlling mixture viscosity and consequently the possibility of obtaining a homogeneous deposit. Otherwise, a dispersing surface-active additive, is useful for allowing a homogenous distribution of particles of A' in the mixture.

The compositions of the invention are generally used in the form of films on a support. The support may be a wall of the device in which vacuum must be maintained (or in which the inner gas composition must be controlled). For instance, in the case of OLEDs, the support may be the inner surface of the rear side (referred to in the field as the backplate), that may be made of glass or metal. Similarly, in the case of FEDs or PDPs, it may be possible to deposit the mixture of A' and B (or B') onto a surface of one of the two glass plates making up the display, preferably the rear one, and treat the assembly at the temperature needed for the conversion A'→A. If B or B' is a silicone resin, this maintains good adhesion to the glass surface. Alternatively, it is possible to manufacture discrete sorbing devices, depositing the precursor mixture on an additional support and then adhering this onto an available wall of the final desired device (for example, on the internal surface of the backplate of an OLED). In case of use of an additional support, again this may be made of glass or be a metallic sheet, for example steel or Nichrofer (an alloy of nickel, chromium and iron), having a thickness, for example, of about 50 µm or less. In the case of the additional support, it is either possible to manufacture sorbing devices one by one, or to manufacture large-sized supports (foils, sheets, plates, or tapes) coated with the precursors mixture, and then to cut these to desired size.

Precursors mixtures can be deposited on the desired support in several ways, for example through brush work or spraying. Preferred is the use of screen-printing, well known in the printing field, allowing greater control of the deposit thickness (by control of screen thickness, through which the mixture is forced to pass for reaching the support).

In any case, thermal treatment for converting A' into A can be carried out at the most suitable moment, for example immediately before introducing the sorbing device into the final system. In the specific case of CaO, it is also possible to "reactivate" the composition, in case that during storing, transporting and handling, the oxide has undergone partial or total transformation into the hydroxide upon water sorption (due to poor control of the process, or to an exposures to air that is either unavoidable or preferred to lower the process complexity and costs). In this case, the ease of transformation of the hydroxide back to the oxide allows this change to be carried out more than one time before the sealing of the device finally desired of the composition of the invention.

The compositions of the invention can be used to produce deposits having thickness values in a wide range. The low end of this range is determined by technical needs only, in particular by the need of having component A in an amount sufficient for the application. In the various tests carried out by the inventors, the lowest limit achieved for the thickness of the final composition is about 20 µm. Compositions and devices of the invention therefore also provide the additional advantage of an easy manufacture, particularly in thin films, of thicknesses lower than a tenth of a millimeter, not obtainable by systems known at present constituted of particles dispersed in a matrix. Thick deposits can be obtained essentially with any desired thickness, but during testing the inventors have noted that thicknesses higher than about 150 µm gave problems of internal cohesion, forming fractures in the deposit. As a consequence, higher thickness deposits can be formed and used if the cracking of the deposit is not a problem in the foreseen application.

The invention will be further illustrated by the following examples. These non-limiting examples show some embodiments intended to teach to those skilled in the art the manufacture of the invention and to represent the best way to carry out the invention.

EXAMPLE 1

43.3 g of $Ca(OH)_2$, 10.3 g of dipropyleneglycolmethylether as a viscosity regulator, 1 g of Dispers 630 (a dispersing surface-active agent), 1 g of Airex 935 as a mixture deaerator, and 44.4 g of Silikophene® P 80/MPA resin (Dispers, Airex, and Silikophen are supplied by Tego Chemie Service Italia) are mixed under stirring. The mixture so obtained is deposited using screen-printing on a Nichrofer sheet having a thickness of 50 µm. From this sheet, some strips of 3×6 cm are cut. Three of these strips are introduced into a chamber provided with a gastight valve. This chamber, with the valve open, is introduced into an oven and the strips are subjected to the following thermal treatment under vacuum:

heating from room temperature to 420° C. in one hour;
keeping at 420° C. for one hour;
cooling under vacuum down to 250° C. and subsequently under argon flow down to room temperature.

The valve of the chamber containing the strips is closed, and the chamber is extracted from the oven, introduced in a glove box, opened, and then the strips are withdrawn. Inside the glove box, the deposit thickness is measured using a comparator, and the results equal to 60±10 µm.

Still inside the glove box, a strip is punched obtaining rectangular-shaped pieces of 10×18 mm. Two of these pieces are inserted into a glass bulb provided with insulating valves, used to carry pieces to the system for measuring moisture sorption properties.

EXAMPLE 2

The bulb with pieces prepared as described in Example 1 is assembled on a bench for sorption tests, allowing the dosing of known amounts of water vapor. The bulb valve is opened, the system is evacuated to remove argon, and the pieces are connected to the system of water dosing in order to keep a constant water pressure of 1 Pa on the pieces and measuring the pieces weight increase $\Delta p$ in time (normalized as regards the deposit surface). The result of the test is represented in the FIGURE, showing that samples of the invention rapidly sorb moisture from the surrounding environment.

Thanks to the fact that the compositions of the invention can be manufactured in extremely reduced thickness, while retaining good sorption capabilities, these compositions are suited for use in OLED screens, in which the available thickness for the gas sorber is always limited. In particular, compositions of the invention can be useful especially for manufacturing OLED screens as disclosed in Japanese Patent No. 3,293,527, in the name of Fuji Electric, which, unlike previous OLED screens, do not have a dedicated housing for the sorbing device, in the form, for example, of a recess or hollow on the rear support of the screen, whereby the thickness available for the sorbing material is further reduced. In these conditions, the possibility offered by the present invention to form sorbing layers having thicknesses even of a few tens of µm allows particularly useful and advantageous results.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A composition for gas sorption comprising a gas sorbing component A dispersed in a component B, component B being in a form of a cross-linked and porous matrix, the composition being obtainable by a process comprising:

mixing at least one material A', that can be converted through a thermal treatment into the sorbing component A, with the component B or a precursor material B' thereof, wherein at least one of component B or material B' comprises a silicone resin, and wherein component B is mixed with material A' if component B is capable of remaining essentially unaltered and of resisting a thermal treatment for changing material A' into the sorbing component A, while material B' is mixed with material A' if material B' is capable of transforming into component B after the thermal treatment; and subjecting the resulting mixture to a thermal treatment under vacuum or under an atmosphere of a gas that is inert with respect to sorbing component A, under conditions which cause conversion of material A' into sorbing component A, wherein the component A comprises an oxide selected from calcium oxide, strontium oxide, barium oxide and magnesium oxide, and the material A' comprises a respective hydroxide.

2. The composition according to claim 1 wherein the component A comprises a moisture sorber.

3. The composition according to claim 2 wherein the component A further comprises boron oxide and the material A' further comprises boric acid.

4. The composition according to claim 1 wherein the component A further comprises an oxygen getter.

5. The composition according to claim 4 wherein the oxygen getter comprises manganese (II) oxide, MnO, and the material A' further comprises manganese (II) carbonate, $MnCO_3$.

6. The composition according to claim 4 wherein the oxygen getter comprises iron (II) oxide, FeO, and the material A' further comprises iron (II) oxalate, $FeC_2O_4$.

7. The composition according to claim 4 wherein the oxygen getter comprises metallic nickel, and the material A' further comprises nickel (II) oxalate, $NiC_2O_4$.

8. The composition according to claim 1 wherein the component A further comprises a physical gas sorber.

9. The composition according to claim 8 wherein the physical gas sorber comprises a moisture sorber.

10. The composition according to claim 9 wherein the moisture sorber comprises γ-alumina, and the A' material further comprises either the aluminum hydroxide norstrandite or the aluminum oxo-hydroxide boehmite.

11. The composition according to claim 1 wherein the material B' or component B comprises a phenyl-methyl-polysiloxane resin.

12. A gas sorbing device comprising a composition according to claim 1, obtained by depositing the mixture of precursor materials A' and B' on a support by brush work, spraying, or screen-printing, and subjecting the deposit to thermal treatment.

13. The gas sorbing device according to claim 12 wherein the support comprises a wall of a final desired device.

14. The gas sorbing device according to claim 12 wherein the support comprises an additional support.

15. The gas sorbing device according to claim 12 wherein the support comprises metal or glass.

16. The gas sorbing device according to claim 12, wherein the composition has a thickness from about 20 to 150 μm.

17. An OLED screen comprising a gas sorbing device according to claim 12.

* * * * *